United States Patent
Brumfield et al.

(10) Patent No.: US 8,799,130 B2
(45) Date of Patent: *Aug. 5, 2014

(54) SYSTEM AND METHOD FOR PREVENTING CROSS TRADING

(71) Applicant: Trading Technologies International, Inc., Chicago, IL (US)

(72) Inventors: Harris C. Brumfield, Chicago, IL (US); Farley Owens, Chicago, IL (US)

(73) Assignee: Trading Technologies International, Inc, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,121

(22) Filed: Aug. 22, 2013

(65) Prior Publication Data

US 2014/0156489 A1 Jun. 5, 2014

Related U.S. Application Data

(63) Continuation of application No. 13/626,879, filed on Sep. 25, 2012, now Pat. No. 8,543,482, which is a continuation of application No. 13/237,364, filed on Sep. 20, 2011, now Pat. No. 8,301,532, which is a continuation of application No. 12/912,172, filed on Oct. 26, 2010, now Pat. No. 8,046,284, which is a continuation of application No. 12/466,464, filed on May 15, 2009, now Pat. No. 7,844,524, which is a continuation of application No. 11/415,870, filed on May 2, 2006, now Pat. No. 7,552,073, which is a continuation of application No. 10/242,062, filed on Sep. 12, 2002, now Pat. No. 7,606,748.

(51) Int. Cl.
*G06Q 40/00* (2012.01)
*G06Q 40/04* (2012.01)

(52) U.S. Cl.
CPC ............... *G06Q 40/04* (2013.01); *G06Q 40/00* (2013.01)
USPC ............................................. 705/35; 705/37

(58) Field of Classification Search
CPC ....................................... G06Q 40/00–40/128
USPC ...................................................... 705/35–45
See application file for complete search history.

(56) References Cited

U.S. PATENT DOCUMENTS

| | | |
|---|---|---|
| 6,772,132 B1 | 8/2004 | Kemp, II et al. |
| 7,127,424 B2 | 10/2006 | Kemp, II et al. |
| 7,389,268 B1 | 6/2008 | Kemp, II et al. |
| 7,552,073 B1 | 6/2009 | Brumfield et al. |
| 7,606,748 B1 | 10/2009 | Brumfield et al. |
| 7,844,524 B1 | 11/2010 | Brumfield et al. |
| 8,046,284 B2 | 10/2011 | Brumfield et al. |
| 8,301,532 B2 | 10/2012 | Brumfield et al. |
| 2002/0156719 A1* | 10/2002 | Finebaum et al. ............... 705/37 |
| 2002/0161687 A1* | 10/2002 | Serkin et al. .................... 705/37 |
| 2011/0040678 A1 | 2/2011 | Brumfield et al. |
| 2012/0011052 A1 | 1/2012 | Brumfield et al. |
| 2013/0018775 A1 | 1/2013 | Brumfield et al. |

* cited by examiner

*Primary Examiner* — Stephanie M Ziegle
(74) *Attorney, Agent, or Firm* — McDonnell Boehnen Hulbert & Berghoff LLP

(57) ABSTRACT

Information regarding the current state in the market is used to prevent orders from crossing. In an example provided herein, when an order is entered into a market, information regarding current positions in the market is taken into account to determine whether the order will cross with other orders. If the orders would cross, appropriate action is taken to prevent the crossing of orders in a way suitable for the person or persons trading. The teachings described herein may be used for any reason to prevent orders from crossing. Moreover, they may be used in other areas of trading to assist the trader in obeying any other rule or regulation that might involve analyzing current positions in the market before taking action.

13 Claims, 3 Drawing Sheets

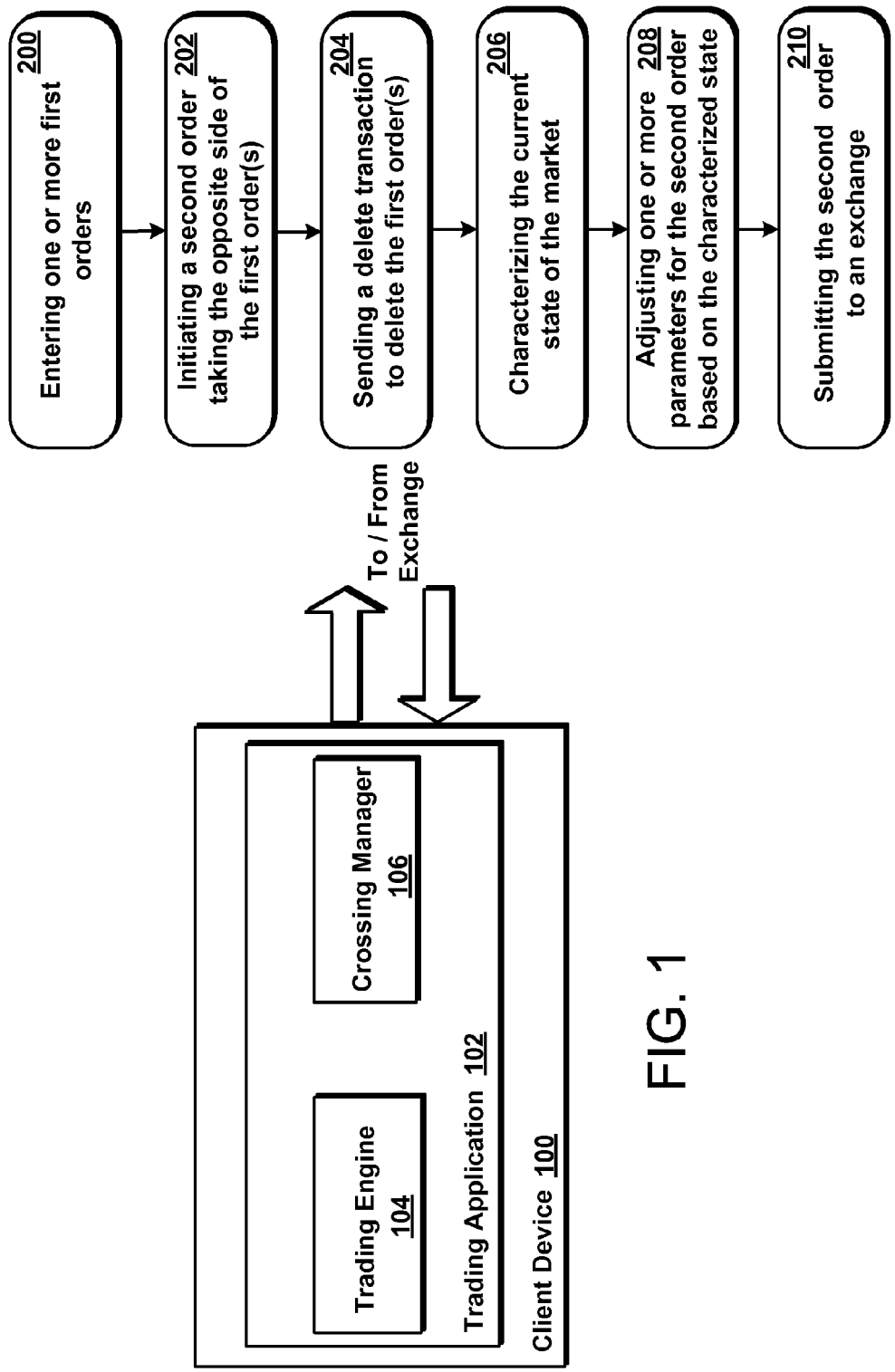

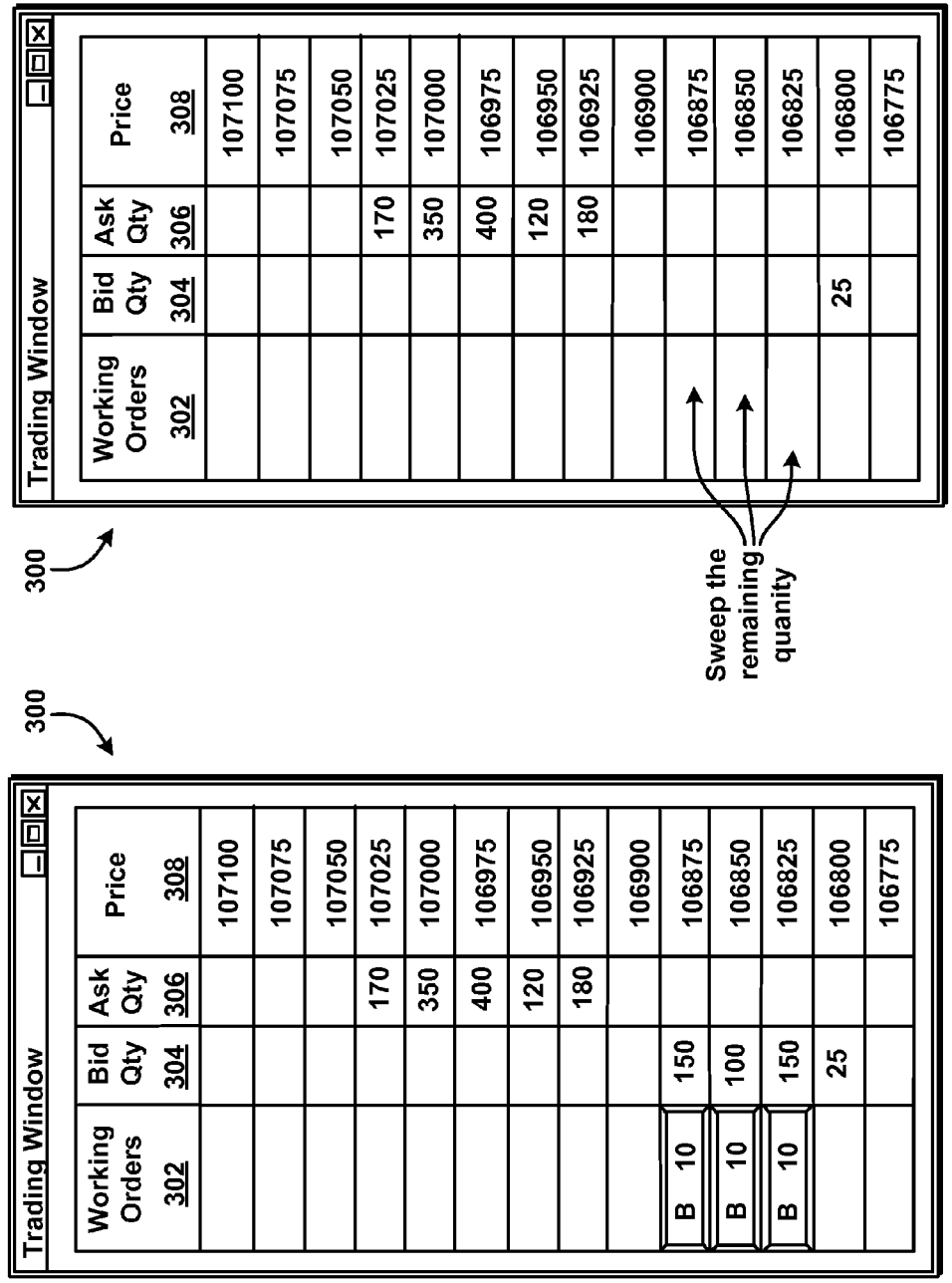

FIG. 5

| Trading Window | | | |
|---|---|---|---|
| Working Orders 302 | Bid Qty 304 | Ask Qty 306 | Price 308 |
| | | | 107100 |
| | | | 107075 |
| | | 170 | 107050 |
| S 20 | | 350 | 107025 |
| S 20 | | 400 | 107000 |
| S 10 | | 120 | 106975 |
| | | 180 | 106950 |
| | 150 | | 106925 |
| | 100 | | 106900 |
| | 150 | | 106875 |
| | 25 | | 106850 |
| | | | 106825 |
| | | | 106800 |
| | | | 106775 |

FIG. 6

| Trading Window | | | |
|---|---|---|---|
| Working Orders 302 | Bid Qty 304 | Ask Qty 306 | Price 308 |
| | | | 107100 |
| | | | 107075 |
| | | | 107050 |
| S 20 | | 170 | 107025 |
| | | | 107000 |
| | | | 106975 |
| | | | 106950 |
| | 140 | | 106925 |
| | 90 | | 106900 |
| | 140 | | 106875 |
| | 25 | | 106850 |
| | | | 106825 |
| | | | 106800 |
| | | | 106775 |

Sweep the remaining quanity

SYSTEM AND METHOD FOR PREVENTING CROSS TRADING

CROSS REFERENCE TO RELATED APPLICATIONS

This application is a continuation of U.S. patent application Ser. No. 13/626,879, filed Sep. 25, 2012, now U.S. Pat. No. 8,543,482, which is a continuation of U.S. patent application Ser. No. 13/237,364, filed Sep. 20, 2011, now U.S. Pat. No. 8,301,532, which is a continuation of U.S. patent application Ser. No. 12/912,172, filed Oct. 26, 2010, now U.S. Pat. No. 8,046,284, which is a continuation of U.S. patent application Ser. No. 12/466,464, filed May 15, 2009, now U.S. Pat. No. 7,844,524, which is a continuation of U.S. patent application Ser. No. 11/415,870, filed May 2, 2006, now U.S. Pat. No. 7,552,073, which is a continuation of U.S. patent application Ser. No. 10/242,062, filed on Sep. 12, 2002, now U.S. Pat. No. 7,606,748, the contents of which are fully incorporated herein by reference.

FIELD OF INVENTION

The present invention is generally directed to electronic trading, and in particular, facilitates trading without crossing orders in an electronic trading environment.

BACKGROUND

Generally, an electronic exchange provides a matching process between traders, or simply buyers and sellers. Some well known exchanges include Eurex, LIFFE, Euronext, CME, CBOT, Xetra, and Island. Traders are typically connected to an electronic exchange by way of a communication link to facilitate electronic messaging between the trader and the exchange. For instance, the trader might submit buy or sell orders to an electronic exchange and later obtain price order fills from the exchange. Ease of submitting buy or sell orders has made electronic exchanges a successful venue for trading. Accordingly, an increasing number of people across the world are actively participating in a market at any given time. The increase in the number of potential market participants has advantageously led to, among other things, a more competitive market and greater liquidity than with traditional methods of trading such as open outcry.

To keep it fair and for other reasons too numerous to mention here, guidelines or rules are often placed that a trader must follow to participate over one or more electronic exchanges. The rules may come from the exchange itself, or the guidelines may be mandated by law in the U.S. or any other country or trading facility that allows or implements electronic trading. However, some rules apply in one country and not another, some rules apply to one exchange and not another, therefore it is often left up to the active participants to follow and obey the rules or else they may be penalized. One such rule that is required by some exchanges and/or countries is that crossing orders by the same trader or trading entity is not allowed. As used herein, crossing orders refers to a trader or trading entity affecting both the purchase and sale of a tradeable object at the same price level. For example, a trader is crossing if he or she has simultaneous buy and sell orders for the same tradeable object at the same price level. A trading entity may be an individual trader, group of traders, and so forth.

However, some types of trading strategies may unintentionally (or intentionally) cross orders. For example, if a trader has a working buy order at a price of 10, and later inadvertently enters a new order to sell at a price of 10, the two orders would cross and violate the above rule. According to another example, a trader may enter an order to sweep the market. That is, the trader may submit an order that "sweeps" up the entire bid or ask quantity available (or a large portion thereof) over one or more price levels. Usually the price levels are chosen so that the order will fill immediately. Because of their very nature, an order that sweeps the market may increase the likelihood of crossing orders.

According to one particular software routine, to prevent orders from crossing, when a new order is submitted any relevant working orders that are opposite to the new order are deleted. Then, simultaneously, or near simultaneously, the new order is submitted to the exchange. Although this solution may prevent orders from crossing, the new order often requires more quantity than is currently available because the current state of the market was not accurately accounted for. Therefore, any remaining portion of the new order will remain in the market as a working order. This is not always preferred.

Thus, there is a need for characterizing the current state of the market and adjusting order parameters, if necessary, based on the state before submitting an order to market to prevent orders from crossing.

BRIEF DESCRIPTION OF THE FIGURES

FIG. 1 is a block diagram that illustrates an example computer system that executes software for ensuring conformity to a particular rule or regulation;

FIG. 2 is a flow chart that characterizes example functionality of a specific embodiment for ensuring conformity to a particular rule or regulation; and FIGS. 3-6 show an interface with example values for illustrating portions of the flow chart of FIG. 2.

DETAILED DESCRIPTION

FIG. 1 is a block diagram that illustrates an example computer system that executes software to prevent orders from crossing in a beneficial way to the trader. Generally, the system, as shown, illustrates a client device 100 and trading application 102 running on the client device 100. In this embodiment, the trading application 102 is a software application that includes software routines such as a trading engine 104 and a crossing manager 106, both of which are described in detail below.

The client device 100 is a computer such as known in the art. A computer includes any device capable of processing information to produce a desired result, and may include workstations, desktops, laptops, hand-held devices, and wireless devices. The client device 100 can access one or more exchanges through a known communication link. Messages may be passed between the client device 100 and the exchange(s) over the communication link. Messages known by one skilled in the art might include price information, order information, and fill information related to one or more tradeable objects being traded on the client device 100. As used herein, a tradeable object refers simply to anything that can be traded. Tradeable objects may include, but are not limited to, all types of traded financial products, such as, for example, stocks, options, bonds, futures, currency, and warrants, as well as funds, derivatives and collections of the foregoing, and all types of commodities, such as grains, energy and metals. The tradeable object may be "real", such as products that are listed by an exchange for trading, or "synthetic", such as a combination of real products that is created by the user.

In general, the client device 100 uses software, collectively referred to herein as a trading application 102, that creates specialized interactive trading screens on the client device's terminal. The trading screens enable traders to enter, obtain market quotes, and monitor positions. The range and quality of features available to the trader on his or her screens varies according to the specific software application being run.

A commercially available trading application that allows a user to trade in an electronic trading environment is X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. The preferred embodiments, however, are not limited to any particular product that performs the translation, storage and/or display functions. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, and U.S. patent application Ser. No. 09/971,087, entitled "Click Based Trading With Intuitive Grid Display Of Market Depth And Price Consolidation," filed on Oct. 5, 2001, the contents of both are incorporated by reference herein. Moreover, the trading application 102 may implement tools for trading tradeable objects that are described in a U.S. patent application Ser. No. 10/125,894 filed on Apr. 19, 2002, entitled "Trading Tools for Electronic Trading," the contents of which are incorporated by reference.

According to a present embodiment, a trading application 102 may utilize a crossing manager 106 to prevent orders from crossing. There are many reasons why someone may not want their orders to cross with each other. For example, crossing orders might be prohibited by a rule or regulation. In another example, a trader would rather not cross orders at an exchange because it might cost the trader more in exchange transaction fees by matching both sides (e.g., matching a buy order and a sell order). It should be understood that those skilled in the art would realize other reasons why someone may not want his or her order to cross. In one embodiment, a trading application 102 utilizes a trading engine 104 that calls on the crossing manager 106 to implement the functionality described herein before orders are sent to the exchange. In an alternative embodiment, the crossing manager 106 monitors messages that are sent to an exchange to determine whether any action described herein should take place. Although the crossing manager 106 is shown integrated with the trading application 102, it should be known that the crossing manager 106 might be a separate software application, integrated with other software applications on the client device 100, or implemented at any device situated along the path between the client device 100 and an exchange (e.g., implemented on a gateway). Therefore, details regarding the hardware and/or software architecture are not necessary for understanding the present invention.

FIG. 2 is a flowchart that characterizes example functionality of a crossing manager program. The flowchart of the Figure is not meant to be limiting in any way, but is only provided to assist in understanding some or all of the functionality of the present embodiment. To further assist in the understanding of the flowchart, several Figures including FIGS. 3-6 are provided. Therefore, each step in FIG. 2 will be accompanied by one or more other Figures. However, it should be understood that the process characterized in the flowchart might occur fast enough such that someone might not see (or a computer might not process) all of the screens displayed in FIGS. 3-6, therefore, some screens might not actually be generated and/or displayed. FIGS. 3-6 are used only to assist in understanding the flowchart using only specific examples. Details regarding the order parameters (e.g., price and quantity), the number of orders, and the types of orders (e.g., an order to buy, an order to sell, an order to sweep the market, etc.) are provided only as a way to illustrate the present embodiment, and are not necessary for understanding the present invention.

Referring to FIG. 2, in step 200, one or more orders are entered into a market. Each order has a price and a quantity associated with it. The order can be an order to buy (e.g., buy order) or an order to sell (e.g., sell order). With respect to the example in FIG. 3, three buy orders have been entered into the market through an interface 300 substantially similar to an interface described in the above-incorporated applications. The three buy orders include one buy order to buy 10 for a price of 106875, one buy order to buy 10 for a price of 106850, and one buy order to buy 10 for a price of 106825. Again, the three buy orders are shown for purposes of illustration, and more or fewer buy orders can be placed at different prices or quantities. According to the example interface, the entered buy orders are shown in a working order column 302. Next to the working order column 302 is a bid quantity column 304 and an ask quantity column 306, where each row in the columns is associated with a price shown in a price column 308. The bid quantity column 304 shows the available quantity that traders are willing to buy at a corresponding price (the available quantity includes the quantities from the buy orders). The ask quantity column 306 shows the available quantity that traders are willing to sell at a corresponding price. It should be understood that details regarding the interface 300 are not necessary for understanding the present invention.

In step 202, a second order is initiated that takes the opposite side to the first order (or a portion thereof) entered in step 200. According to one embodiment, an order is initiated when a trader or trading entity chooses to enter an order into the market at one or more price levels. With respect to FIG. 3, assume that the same person or trading entity that entered the buy orders in step 200 also initiated a sell order at a price of 106825 to sweep the market. According to this example, the initiated sell order to sweep the market means the trader is willing to sell 150 at a price of 106825, 100 at a price of 106850, and 150 at a price of 106875. Note that a sell working order in column 302 does not appear in the Figure, because in this instance, the sell order would be filled almost instantaneously and therefore it would not be necessary to display. However, a sell working order can appear if programmed to do so.

In step 204, a delete transaction message is submitted to the exchange indicating the desire to delete the first order(s). According to one embodiment, crossing orders at the exchange is prevented by deleting any orders that may potentially cross with the second order. The system determines the relevant orders to delete, which means that it does not necessarily delete all working orders. However, in the example provided in FIGS. 3-4, the first orders would cross with the second order because they are each at a price equal to or above the price of the second order. According to this example, the system reacts by submitting a delete transaction message to the exchange indicating the desire to delete the three working buy orders.

In step 206, the current state of the market is characterized. The current state of the market may be characterized in many ways, depending on how the system is programmed. For instance, if the actual bid quantity available in the market is of interest, the system attempts to accurately characterize all of the bid quantity available. In another instance, the actual ask quantity available in the market may be of interest, in which the system attempts to accurately characterize all of the ask quantity available. The system may characterize the market in these two instances by counting up the perceived bid or ask quantity along with quantity which may have been deleted, added, replaced, implied, and so on, in addition to transactions in-flight. In-flight transactions include those transactions that have been sent to the exchange, but the client device 100 has not yet seen a confirmation indicating that the exchange is processing the transaction.

Using the example provided in FIGS. 3-4, the market is characterized by determining the bid quantity actually available in the market by taking into account the delete transactions from step 204. In this example, the bid quantity actually available in the market at the exchange is the quantity of the first orders (buy orders) deleted from the quantity of second order (the sell order), or equivalently 400−30=370. Another way, yet similar way, to compute the remaining bid quantity is to add up the individual quantities at the relative price levels (150−10)+(100−10)+(150−10)=370. Characterizing the market in this way attempts to provide the crossing manager with a best estimation of the current state of the market. As described herein, other methods for characterizing the market may be used.

In step 208, one or more parameters for the second order are adjusted based on the characterized state of the market. Parameters for an order (or order parameters) include its price over one or more levels and its associated quantity. According to the example in FIGS. 3-4, the quantity for the second order (the sell order) is adjusted or determined based on the actual bid quantity available at a price level of 106825 and above. Recall that the actual bid quantity available is 370, which was computed earlier.

In step 210, the second order is submitted to the exchange. The sell order then would be submitted with a total quantity of 370, such that it might fill 140 at 106825, 90 at 106850, and 140 at 106875. The total quantity bought or sold can optionally be displayed. For example, a window or cell located in or near the trading window might display the total quantity of 370 sold in the last transaction. Although, indicating this value or any other value related to this transaction is optional, it may be useful to see how much quantity was actually traded from the order.

Note that the initiated sell quantity was for 400, but a sell order for 370 was submitted to the exchange. If programmed to do so, instead of dropping a portion of the initiated sell order (e.g., dropping the 30 of the initiated 400-lot sell order) part of the second order may be treated as if it was internally matched with the first order. Such internally matched orders can be programmed to generate a fill transaction or they can be programmed not to generate a fill transaction. According to one example, the second order may be treated as if it was internally matched with the first order(s) of the trader at his or her client device, treated as if it was internally matched with the first order(s) at a trading house, or treated as if it was internally matched with the first order(s) at some other location. However, preferably this may happen only when treating orders as if they were internally matched at the client device, at a trading house, or at another location is not limited to the same crossing rules or regulations as the exchange in the example. Then, according to the above example, 30 of the initiated 400-lot sell order might be treated as internally matched against the three separate buy orders so that trader had actually matched 400, that is, 370 were matched at the exchange and 30 were treated as if they were matched internally. A possible benefit for treating orders as if they were matched internally is that the trader may not have to pay exchange fees for matching the orders. It should be understood that the invention is not limited for use only at an exchange, but may be also be used for prohibiting orders from crossing at any location including the trader's client device, if so desired.

The example process described above provides a unique approach to providing an intelligent solution to avoid crossing orders at an exchange or any other location that prohibits orders from crossing. Another example, provided below, takes a similar approach but instead of submitting a sell order to sweep the market, the trader or entity is submitting a buy order to sweep the market.

Referring back to step 200 in FIG. 2, one or more orders are entered. With respect to FIG. 5, three sell orders have been entered into the market. The entered sell orders are shown in the working order column 302. The three sell orders include one sell order for 20 at a price of 107025, one sell order for 20 at a price of 107000, and one sell order for 10 at a price of 106975. For similar reasons as the three buy orders in the above example, the three sell orders are shown for purposes of illustration only and that more or fewer sell orders can be placed at different prices or quantities.

In step 202, a second order is initiated that takes the opposite side to the first order entered in step 200. Assume that the same person or entity that entered the sell orders in step 200 also initiated a buy order to buy all of the ask quantity available for a price of 107000 and lower. This includes 350 at a price of 107000, quantity 400 at a price of 106975, quantity 120 at a price of 106950, and quantity 180 at a price of 106925, for a total quantity of 1050.

In step 204, a delete transaction message is sent to the exchange to delete all relevant orders. The relevant orders (sell orders) in this example include those orders that have a price equal to or below the buy order price. Note that a sell order for 170 at 107025 is still in the market because the trader or entity wanted to keep this order in the market; however, this action is dependent on the wants of the trader or entity.

In step 206, the current state of the market is characterized. As described above, the current state of the market may be characterized in many ways, depending on how the system is programmed. Using the example from FIGS. 5-6, the quantity from the sell orders is deleted from the perceived ask quantity available, or equivalently 1050−30=1020. Another way to compute the remaining relevant ask quantity is 330+390+120+180=1020).

In step 208, one or more parameters for the second order are adjusted based on the characterized state of the market. According to the example in FIGS. 5-6, the bid quantity for the buy order is adjusted or determined based on the actual bid quantity available at a price level of 107000 and below. Consequently, the quantity for the second order is 1020, which was computed earlier.

In step 210, the second order is submitted to the exchange. Using the example in FIGS. 5-6, the second order had a sell quantity of 1020. The buy order would fill 330 at 107000, 490 at 106975, 120 at 106950, and 180 at 106925 for a total quantity of 1020. The total quantity bought or sold in the sweep can optionally be displayed.

Recall that the present embodiments can be applied to any type of order. Sometimes, rather than entering an order to sweep the market, a trader might wish to enter a second order, opposite to a first order, at one price level instead of more than one price level. In an example, referring again to FIG. 3, assume that three buy orders are in the market. Assume also that a trader enters an order to sell 150 for a price of 106875. According to one embodiment, a delete transaction message is sent to the exchange deleting the buy order of 10 at a price of 106875. Then, a sell order is submitted to the exchange indicating a willingness to sell 140 for a price of 106875.

In the above examples, the second quantity was often adjusted based on the characterization of the market. However, sometimes it might also be desirable to adjust the first order quantity in the market. To illustrate using a particular example in FIG. 3, assume that a trader initiated an order to sell 5 at a price of 106875. Then, the software can change (or cancel and replace) the buy order from buying 10 to buying 5 at a price of 106875 and according to this example, would not necessarily need to send a sell order to the exchange. Alternatively, the software can delete the buy order for 10 and send an order to buy 5 at 106875.

A trader or entity may wish to dynamically switch between using anyone of the intelligent systems described above and another system that simply sends in an order only for the amount of perceived quantity in the market and leaving any remaining working orders in the market.

The system and related methods may be tailored to a trader's or entity's trading strategy depending on the types of orders they submit. The system and related methods may use information about the trader's or entity's current positions, or current state in the market, to determine how not to cross simultaneous orders. The system and related methods are useful in countries or for use with exchanges which prohibit orders from crossing due to simultaneous buy and sell orders entered by the same trader or trading entity. The system and related methods described herein, including the ability to analyze other information to conform to a certain rule or regulation may also be used in other areas of trading to assist the trader in obeying the rule or regulation. The system and related methods may also be useful for any other reason that someone might have for preventing orders from crossing, for example, to avoid paying exchange fees for matching orders as mentioned above.

Having now described a few embodiments of the invention, and some modifications and variations thereto, it should be apparent to those skilled in the art of trading that the foregoing is merely illustrative and not limiting, having been presented by the way of example only. Moreover, although it was previously mentioned, it should be understood that the content displayed in the trading interface was provided to assist in illustrating some concepts. The process, however, may occur quickly such that initiating a second order, performing some calculations, and actually submitting the second order to the exchange appears to the trader (and exchange) that he or she submitted an order rather than initiating one. Hence, initiating an order and submitting an order may be used interchangeably.

As such, numerous modifications and other embodiments are within the scope of one of ordinary skill in the art and are contemplated as falling within the scope of the invention as limited only by the appended claims and equivalents thereto.

The invention claimed is:

1. A non-transitory computer readable medium having stored therein instructions executable by a processor, wherein the instructions are executable to:
   receive a command to place an order to sweep one or more price levels for a tradeable object on behalf of a particular trading entity, wherein the one or more price levels are for a first side, wherein the first side is one of a bid side and an ask side, wherein the order to sweep is for a sweep quantity;
   initiate deletion of one or more working orders at an electronic exchange for the tradeable object prior to initiating placement of the order to sweep, wherein the one or more working orders were placed on behalf of the particular trading entity, wherein the one or more working orders are on a second side, wherein the second side is opposite from the first side, wherein the one or more working orders are at prices in the one or more price levels of the order to sweep;
   adjust the sweep quantity for the order to sweep by subtracting a working quantity for each of the one or more working orders; and
   initiate placement of the order to sweep with the adjusted sweep quantity.

2. The computer readable medium of claim 1, wherein the first side is the bid side and the second side is the ask side.

3. The computer readable medium of claim 1, wherein the first side is the ask side and the second side is the bid side.

4. The computer readable medium of claim 1, wherein the instructions are further executable to place the one or more working orders.

5. The computer readable medium of claim 1, wherein the initiating deletion of the one or more working orders includes beginning to send a message to the electronic exchange to delete the one or more working orders.

6. The computer readable medium of claim 1, wherein the initiating placement of the order to sweep includes beginning to send a message to the electronic exchange to place the order to sweep.

7. The computer readable medium of claim 1, wherein the placement of the order to sweep is initiated after receiving confirmation of the deletion of at least one of the one or more working orders.

8. The computer readable medium of claim 1, wherein the placement of the order to sweep is initiated prior to receiving confirmation of the deletion of the one or more working orders.

9. The computer readable medium of claim 1, wherein the command to place the order to sweep is received from a user input device.

10. The computer readable medium of claim 1, wherein the command to place the order to sweep is received from a client device.

11. The computer readable medium of claim 1, wherein a client device includes the processor.

12. The computer readable medium of claim 1, wherein a gateway includes the processor.

13. The computer readable medium of claim 1, wherein a server includes the processor.

* * * * *